United States Patent [19]

Kaas

[11] B  3,998,991
[45]  Dec. 21, 1976

[54] TRANSPARENT ABRASION-RESISTANT COATING FOR A STYRENE ACRYLONITRILE COPOLYMER AND METHOD

[75] Inventor: Roger L. Kaas, Royal Oak, Mich.

[73] Assignee: General Motors Corporation, Detroit, Mich.

[22] Filed: Mar. 29, 1974

[21] Appl. No.: 456,069

[44] Published under the second Trial Voluntary Protest Program on March 9, 1976 as document No. B 456,069.

[52] U.S. Cl. .................... 428/447; 260/348 SC; 427/302; 427/407 C; 427/322; 428/413; 428/451; 428/520; 428/522

[51] Int. Cl.$^2$ .................... B32B 9/04; B05D 3/10

[58] Field of Search ... 117/47 A, 161 ZA, 138.8 UA, 117/161 UZ, 62, 161 UC, 161 ZB; 260/348; 427/322, 302, 407, 348 SC; 428/447, 451, 522, 520, 413

[56] References Cited

UNITED STATES PATENTS

| | | |
|---|---|---|
| 2,744,878 | 5/1956 | Smith et al. ............... 117/161 ZA |
| 3,616,294 | 10/1971 | Khelghatian .................... 117/47 A |
| 3,619,246 | 11/1971 | Bragok ............................ 117/47 A |
| 3,650,814 | 3/1972 | Elder ........................... 117/161 ZA |
| 3,650,859 | 3/1972 | D'Ohario ........................ 117/47 A |
| 3,713,880 | 1/1973 | Krekeler ..................... 117/161 ZA |

*Primary Examiner*—Ralph Husack
*Assistant Examiner*—Janyce A. Bell
*Attorney, Agent, or Firm*—George A. Grove

[57] ABSTRACT

In accordance with a preferred embodiment of this invention, a styrene-acrylonitrile copolymer (SAN) surface is coated with a weatherable, transparent and abrasion-resistant material. The film coating, which is typically less than one micron thick, is formed on a SAN surface which has been chemically activated by direct contact with a strong oxidizing agent. The coating consists essentially of the condensation reaction product of a partially hydrolyzed poly(vinyl acetate), equilibrated tetraethyl orthosilicate and a silane compound, which also acts as an adhesion promoting agent and which is selected from the group consisting of compounds with the general formula:

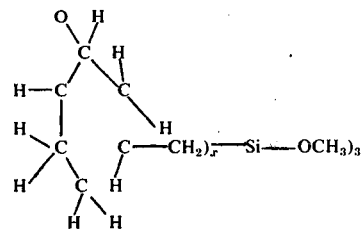

where $x$ is from 1 to 10 and compounds with the general formula:

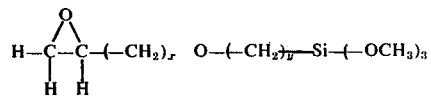

where $x$ is from 1 to 10 and $y$ is from 1 to 10. The trimethoxy functionality of the silane compound is initially hydrolyzed to a trisilanol functionality. Then by participating in a condensation reaction with the equilibrated silicate and the partially hydrolyzed acetate, the silane is chemically bound into the coating matrix. To complete the chemical link between the coating and the substrate, the epoxy functionality apparently reacts with the treated SAN substrate. By these two mechanisms the silane compound apparently provides a stable covalent chemical bond between the coating and the substrate.

5 Claims, 2 Drawing Figures

TRANSPARENT ABRASION-RESISTANT COATING FOR A STYRENE ACRYLONITRILE COPOLYMER AND METHOD

BACKGROUND OF THE INVENTION

This invention relates to a scratch-resistant styreneacrylonitrile copolymer (SAN) article particulary suitable for optical devices such as windows, lenses or mirrors. More particularly, this invention relates to a thin silica based coating which is transparent, strongly adherent to the SAN substrate, weatherable and abrasion resistant.

The optical clarity, low cost and light weight of the styrene-acrylonitrile copolymers have long been recognized. However, their use in many applications has been hindered by their softness which renders them susceptible to scratching.

The general concept of applying an abrasion-resistant, silica or silicate type coating to a soft polymeric substrate is not novel, but each application presents a distinct set of problems. This invention is directed at producing a strongly adherent and abrasion-resistant coating which retains its desired properties after prolonged exposure to temperature and humidity extremes and changes.

Abrasion-resistant coatings, prepared in accordance with the prior art, could not withstand exposure to repeated changes in temperature and humidity. A series of twelve humidity/thermal crack cycles was used as a representative screening test with each cycle consisting of 1) a 24 hour exposure to 100°F. and 100% relative humidity, 2) 20 hours at minus 10°F., and then 3) four hours at ambient room conditions. After exposure to this series of crack cycles, the various coatings were evaluated and none were capable of providing adequate abrasion resistance to the SAN substrate. Two distinct failure modes were evident. First, there were coated samples which were severely crazed by the series of crack cycles, and this, of course, destroyed the optical clarity of the article. This failure was apparently caused by the internal stresses created by the difference between the coefficient of expansion of the coating and that of the substrate. The magnitude of these stresses becomes apparent when one realizes that the coefficients of expansion of a silica-based coating and the substrate may differ by one order of magnitude or more. The other failure mode was a loss of adhesion between the coating and the substrate. If adhesion is lost, the coating can be scuffed off during cleaning and wiping operations, leaving the SAN unprotected from abrasion. Thus, strong adhesion developed through the stable chemical linkages between the coating and the substrate is necessary.

It is an object of my invention to provide a laminated article comprising an abrasion-resistant silicate coating chemically bonded to a styrene-acrylonitrile copolymer substrate, which article is clear, abrasion-resistant and weatherable.

It is a further object of my invention to provide a clear, abrasion-resistant coating, which coating is bonded to a transparent styrene-acrylonitrile copolymer article, and which coating is sufficiently flexible to withstand severe thermal shocks without cracking or crazing.

It is another object of my invention to provide a process for coating the styrene-acrylonitrile copolymer with a clear, abrasion-resistant and weatherable film.

SUMMARY OF THE INVENTION

In accordance with a preferred embodiment of my invention, these and other objects are accomplished by first providing a clear, styrene-acrylonitrile, random copolymer (SAN) article of a suitable predetermined configuration. The SAN resin is preferably from 20 to 30% by weight acrylonitrile.

The surface to be coated is prepared by treating it with a strong oxidizing agent, such as a solution containing an alkali metal dichromate and a concentrated sulfuric acid or other mineral acid. This treatment cleans the article and apparently creates chemically active sites, most probably carboxyl groups, on the surface.

Then the subject coating solution is applied by dipping, spraying or other suitable means. This solution contains a solvent, a partially hydrolyzed poly(vinyl acetate) film former, an equilibrated tetraethyl orthosilicate (TEOS) which ultimately provides the abrasion resistance and a silane adhesion promoting agent selected from a group consisting of the compounds described by the general formula:

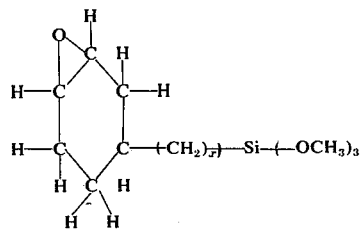

where $x$ is from 1 to 10 and compounds with the general formula:

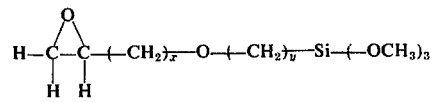

where $x$ is from 1 to 10 and $y$ is from 1 to 10. Gamma-glycidoxypropyltrimethoxysilane is an example of a preferred silane. In solution the trimethoxy functionality is readily hydrolyzed to a trisilanol functionality, which allows the compound to enter into condensation type reactions with other hydrolyzed or equilibrated groups. This solution also preferably contains a surfactant and a foam inhibitor. The solvent for the coating solution is essentially a solution of about equal parts water and a cosolvent selected from the group consisting of alkyl alcohols having up to 7 carbon atoms and alkyl carboxylic acids having up to 7 carbon atoms. The coated article is then baked at about 90° C. for about one hour to promote a condensation reaction among the hydrolyzed and equilibrated functionalities, and to evaporate the solvent and other volatile materials formed during the reaction.

The equilibrated TEOS, the partially hydrolyzed poly(vinyl acetate) and the hydrolyzed trimethoxy functionality of the silane compound participate in the aforementioned condensation reaction and the dried product of this reaction is a crosslinked matrix which is strongly adhered to the SAN substrate and provides the desired abrasion resistance. In the course of this condensation reaction, the silanol end of the hydrolyzed silane molecule is chemically locked into the film matrix and the epoxide end of this molecule is believed to chemically combine with active groups on the surface of the treated SAN substrate. Therefore, the silane compound serves as a chemical link between the coating and the substrate and there is no hydrolyzable structure such as the carbon-oxygen-silicon combination in the linkage. Thus, the subject formulation provides a coating that is not vulnerable to hydrolytic attack, unlike many of the previously disclosed coating systems.

The partially hydrolyzed poly(vinyl acetate) and the silane compound also contribute a degree of flexibility to the coating by reducing the crosslink density of the matrix. If the tetrafunctional silicate compound were the only ingredient in the condensation reaction product, the resulting matrix would be heavily crosslinked and, therefore, very rigid and brittle. Since the silane compound has only a trifunctional silanol group, it interrupts the continuity of the matrix formed predominantly by the tetrafunctional silicate groups and, in effect, reduces the crosslink density. In addition, both the partially hydrolyzed poly(vinyl acetate) and the silane compound physically disrupt the continuity of the matrix and thereby further reduce its rigidity. Therefore, this unique coating is capable of withstanding a rather severe series of thermal shocks without crazing or cracking.

In accordance with my invention, these and other objects and advantages will be better understood in view of detailed descriptions of the coating and the methods of application and evaluation which follow.

In the drawing:

FIG. 1 is a graph illustrating the abrasion resistance of (A) an uncoated SAN surface, (B) a SAN surface which has been coated in accordance with the novel process herein disclosed, and (C) a SAN surface which has been coated in accordance with this novel process and then subjected to accelerated aging tests to determine its resistance to temperature and humidity variations and extremes.

FIG. 2 is a schematic cross-sectional view of a typically coated SAN substrate comprising the SAN substrate 1, having an integral crosslinked coating 2 thereon. a tenacious, humidity resistant bond between the substrate 1 and the coating 2 is indicated at 3.

DETAILED DESCRIPTION OF THE INVENTION

Figure 1:
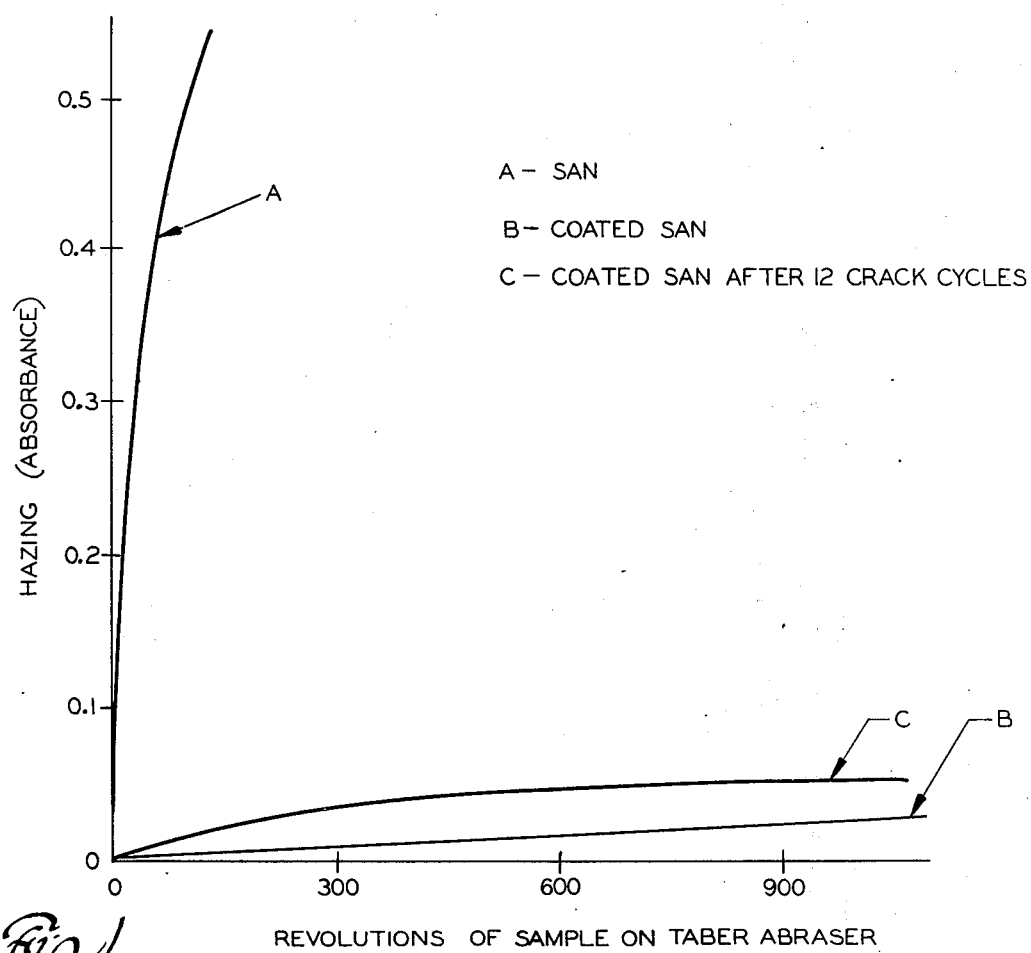
Figure 2:
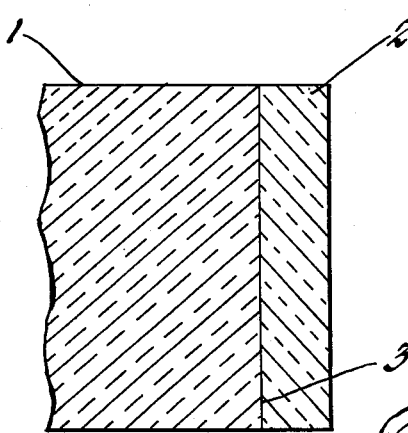

In accordance with my process, the first step is to provide a clean surface and then bring that surface into direct contact with a strong oxidizing agent such as a saturated solution of an alkali metal dichromate in a concentrated mineral acid, or an oxygen plasma, for a suitable period of time which will be inversely proportional to the strength of the acid or the power input to the oxygen plasma. It is believed that chemically active sites are created by this process, however, it should be emphasized that the concentration of active sites on the SAN surface is very low, as indicated by the inability of conventional analytical techniques to determine the character or number of these sites. Therefore, the scope of this patent is not to be limited to a specific action of such sites.

A suitable solution for treating the SAN article prior to coating is made up of, by weight, from 55 to 100 parts of a strong mineral acid such as commercially available concentrated aqueous sulfuric acid ($H_2SO_4$) which is from 96 to 98% $H_2SO_4$ and from 1.2 to 2.0 parts of a saturated aqueous solution of alkali metal dichromate and from 0 to 40 parts of additional water. However, the preferred treating solution consists of, by weight, 73 parts concentrated sulfuric acid, 1.5 parts saturated aqueous sodium dichromate solution and 26 parts of additional water.

The immersion time necessary to achieve the desired surface pretreatment is inversely proportional to the concentration of the sodium dichromate and the sulfuric acid. At the preferred concentrations the SAN surface is preferably immersed for about five minutes, but the required immersion time varies with the concentrations of sodium dichromate and sulfuric acid from about 0.75 minute to about thirty minutes.

In the oxygen plasma process of treating the SAN surface, the article is placed in a sealed chamber, which is then evacuated to a pressure of from 0.1 to 2.0 mm of mercury and slowly purged with oxygen. A coil located around the partially evacuated chamber produces electromagnetic energy in the chamber and generates the desired radio frequency plasma. The input frequency may vary from 0 to many thousand magahertz with little or no impact on the quality or performance of the subject coating. My work with a Model PUC301 plasma chamber manufactured by the LFE Company has demonstrated that a power input in the range of 30 to 300 watts is capable of adequately treating a surface area ranging from 10 to 100 square inches. In addition, a DC corona produced plasma operating at atmospheric pressure will also adequately treat a polymer surface.

The second step in the preferred process is applying the protective topcoat to the previously treated article. This topcoat is applied by immersing the treated surface in a solution containing partially hydrolyzed poly(vinyl acetate), equilibrated tetraethyl orthosilicate and a silane coupling agent which has the capability of both participating in the condensation reaction which produces the coating film matrix and interacting, physically or most probably chemically, with the treated SAN surface. A solution coating process is preferred as it insures a thorough dispersion of reactants and a relatively uniform deposition. However, as other suitable techniques would be obvious to one skilled in the art, the scope of this invention is not limited to the specifically disclosed solution-coating process.

A preferred coating solution may be formulated in accordance with the following procedure and proportions. First, 14 grams of poly(vinyl alcohol), which is 85% hydrolyzed poly(vinyl acetate), are dissolved in a solution of 75 milliliters of water and 75 milliliters of acetic acid; then one drop of a suitable antifoaming agent, such as 1-octanol, is added. Other suitable hydroxylated polymers, such as poly(vinyl butyral), may be substituted for the preferred poly(vinyl alcohol). When the poly(vinyl alcohol) has completely dissolved, 17.6 grams of gamma-glycidoxypropyltrimethoxysilane and 70.5 grams of equilibrated tetraethyl orthosilicate are then added. Finally, 15 drops of an appropriate surfactant are added; the surfactants used in the following described experiments were of the nonionic, water soluble, silicone type, such as that marketed by Union Carbide Corporation under the designation "L-77". Specifically, Union Carbide L-77 is used. The coating solution is then filtered to remove any particulate contamination.

The cleaned and treated SAN article is dip-coated with the subject coating solution by immersing it and then immediately withdrawing it at a rate of about inches per minute. After withdrawal, the article is baked at a temperature within a suitable range of from 25° C. to 95° C., preferably 90°C., for a period of time within the suitable range of from 5 to 120 minutes, preferably 60 minutes. This bake cycle dries the surface and allows the abrasion-resistant coating to form.

A suitable coating solution may consist of, by weight, from ½ to 15 parts of the subject silane compound, and from 1 to 10 parts of hydrolyzed poly(vinyl acetate) which has been from 20 to 90% hydrolyzed to poly(vinyl alcohol), and from 20 to 40 parts of water, and from 20 to 40 parts of a solvent selected from the group consisting of alkyl alcohols having up to 7 carbon atoms, and alkyl carboxylic acids having up to 7 carbon atoms, and from 10 to 50 parts of tetraethyl orthosilicate which has been previously equilibrated in the presence of water. The equilibration process is a well known technique and is accomplished by simply mixing the ethyl orthosilicate with water in stoichiometric proportions and using any mineral acid as a catalyst. For example, mixing 23 parts of TEOS with 4.6 parts of a 15% HCl aqueous solution will produce an equilibrated TEOS material.

The preferred coating solution consists of 6 parts of 85% hydrolyzed poly(vinyl acetate), 30 parts water, 30 parts acetic acid, 7 parts of gamma-glycidoxypropyltrimethoxysilane, and 28 parts of said TEOS solution.

The function of the silane compound in this coating formulation is to promote the adhesion between the coating and substrate. The epoxide end of this molecule apparently chemically combines with the carboxyl groups which were formed on the surface of the styreneacrylonitrile copolymer substrate by the initial treatment with the oxidizing agent. At the other end of this adhesion promoting molecule the methoxy groups are initially hydrolyzed to form a silanol type functionality. The silanol groups then react with the silanol groups in the silicate coating by a condensation mechanism leaving a carbon-silicon-oxygen-silicon (C-Si-O-Si) bond between the SAN substrate and the coating material. Thus, a stable, nonhydrolyzable chemical bridge is formed between the coating and the substrate. At this point it becomes obvious to one skilled in the art that both oxidizing treatment and the adhesion promotion agent are necessary to form a weatherable lamination between the coating and the substrate.

In the preferred formulation of the silane compound is blended directly into the coating solution. However, this compound can be applied in a separate step as a primer coat. In the primer solution, 1 part by volume of the silane compound is blended with 5 parts by volume of water and 95 parts by volume of isopropyl alcohol. A suitable primer solution may contain, by volume, from ½ to 15 parts of a suitable silane, such as those described above, 5 to 20 parts of water and from 80 to 110 parts of an alkyl alcohol having up to seven carbon atoms. Previously cleaned and treated styreneacrylonitrile copolymer (SAN) surfaces can then be dip-coated with this primer and baked one hour at 90° F. before the topcoat, which is the same as described above, but contains no silane, is applied.

The long term effective abrasion resistance of a thin coating depends both upon the toughness and hardness of the coating and the strength of the adhesive bond between the coating and the substrate. In evaluating the prior art and the subject coating formulations and application processes, two basic tests were used. The initial test was a tape adhesion test which involved simply pressing a standardized cellophane adhesive tape onto the surface coating and then lifting the tape. If the coating was lifted from the treated surface with the tape the adhesion of the coating to the substrate was considered inadequate and no further tests were made. If the topcoat was not pulled off the substrate an abrasion resistance evaluation was then performed. A Taber Abraser was employed to more quantitatively assess the overall abrasion resistance of the coating.

The Taber Abraser is designed and constructed to bring a standardized abrasive surface and the coating surface to be evaluated into a carefully controlled sliding contact. The loading force and the relative velocity of the two surfaces are standardized, and the total contact time is precisely monitored. Mechanically, the Taber Abraser has a rotating, horizontal table to which a disc of the sample material is clamped, and two abrasive wheels whose axes are mutually coincident and perpendicular to, but do not intersect the axis of the rotating platform. These wheels are allowed to rotate about their own axes as they are brought into contact with the rotating sample, and a constant load of 500 grams is applied.

After the article has been abraded on the Taber Abraser, the degree of light absorbance or hazing of the sample's surface is measured by a Cary 14 Comparative Spectrophotometer with the zero setting established on a nonabraded section of the coated sample. Therefore, a reading of zero obtained at an abraded region would indicate a fully abrasion-resistant, scratch-free surface and a reading of infinity would indicate a completely opaque and totally abraded surface.

FIG. 1 is a plot of the hazing (light absorbance) or abrasion of a specific surface as a function of the exposure time of that the surface to the standard abrasion of the Taber Abraser. The curve labeled A illustrates that the noncoated SAN surface is very soft and therefore easily abraded. After a relatively few rotations of the wheel the ability of the initially transparent article to transmit light was markedly reduced. Curves B and C, however, demonstrate the hardness and abrasion resistance of the subject coating and durability under repeated crack cycles which were designed to test the weatherability of a coating. Each cycle consists of exposing the coated article to 100°F. and 100% relative humidity for 24 hours, and then to minus 10° F. for 20 hours, and then to ambient conditions for 4 hours.

These and other aspects of my invention will be more fully appreciable in view of the specific examples which follow:

EXAMPLE NO. 1

The surface of a styrene-acrylonitrile copolymer sample disc was prepared by immersing it in a sodium dichromateconcentrated sulfuric acid solution for five minutes. This solution was prepared by mixing, by weight, 73 parts of a concentrated aqueous sulfuric acid solution, which was from 96 to 98% $H_2SO_4$, 1.5 parts of a saturated aqueous solution of sodium dichromate, and 26 parts of additional water. After the acid wash the surface was thoroughly rinsed with water and then with isopropyl alcohol before air drying.

The coating formulation, which in this example contained both the silicate and the adhesion promoting agent, was prepared by first dissolving 14 grams of poly(vinyl alcohol) (85% hydrolyzed poly(vinyl acetate)) in 150 milliliters of a solution of equal parts water and acetic acid. When the PVA was dissolved, 17.6 grams of gamma-glycidoxypropyltrimethoxysilane were added and dissolved. Subsequently, 70.5 grams of equilibrated tetraethyl orthosilicate (TEOS) were added. The equilibrated TEOS was prepared by vigorously shaking 59 grams of TEOS and 11.5 grams of 15% aqueous hydrogen chloride; this equilibration step hydrolyzes the ethoxy groups ($-O-CH_2-CH_3$) to hydroxyl groups ($-OH$). One drop of 1-octanol was added to the coating solution as an antifoaming agent and 15 drops of a commercially available, nonionic, water soluble, silicone surfactant were added to the solution.

The previously prepared surface was then coated by immersing it at room temperature in the coating solution and withdrawing it at a rate of 4 inches per minute. The article was then baked for one hour at 90° C. to dry and form the abrasion-resistant coating matrix.

This coating passed the initial tape adhesion test and, therefore, its abrasion resistance was evaluated using the Taber Abraser. Absorbance readings were taken at relatively close intervals to adequately define the relationship between the hazing and the exposure time of the coated surface to the abrasive wheel. As shown in FIG. 1, Curve B, this coating performed well, and therefore tests were initiated to evaluate the coating's weatherability. Samples were subjected to 12 thermal and humidity crack cycles of 24 hours at 100° F. and 100% relative humidity, 20 hours at minus 10° F. and finally 4 hours at ambient room conditions. The abrasion resistance was then evaluated on the Taber Abraser.

The abrasion data, before and after the crack cycles, are graphically illustrated in FIG. 1. Curve A illustrates the rather poor abrasion resistance of uncoated SAN and is cited here for comparative purposes. Curve B demonstrates the dramatic effect of this coating formulation in improving the article's initial resistance to scratching. Curve C shows the small but definite detrimental effect of the temperaturehumidity cycling. Based on this data, this formulation was considered suitable for automotive type applications.

Example 2 demonstrates that the silane compound may be applied in a separate primer coat, and Examples 3 and 4 demonstrate that each basic element of the subject process is necessary to achieve a successful coating.

EXAMPLE NO. 2

The surface of this styrene-acrylonitrile article was prepared in the same manner as described in Example No. 1. The adhesion promoting agent was then applied in a separate primer coat. The primer solution was prepared by blending one part by volume gamma-glycidoxypropyltrimethoxysilane, five parts by volume distilled water, and 95 parts by volume isopropyl alcohol. The article was then dip-coated with this solution and baked one hour at 90° C. to dry the primer coating.

The primer SAN article was then dip-coated in a coating solution identical to that described in Example 1, except that the silane compound was omitted. After this coating step, the article was baked one hour at 90°C. This coating also demonstrated excellent coating adhesion and abrasion resistance even after exposure for more than one month at 100° F. and 100% relative humidity.

EXAMPLE NO. 3

The styrene-acrylonitrile surface in this example was cleaned and treated with the acid solution as described in Example 1. A topcoat formulation which contained no silane adhesion promoting agent was applied to the treated surface and baked thereon as described in Example 2. Initially, this coating easily passed the tape adhesion test, however, after aging in a 100% relative humidity atmosphere at 100° F. for twenty-four hours, the adhesion of this coating to the substrate was very poor. This led to the conclusion that the silane compound was necessary to create a suitable bond which would be resistant to hydrolytic attack.

EXAMPLE NO. 4

The styrene-acrylonitrile surface in this example was prepared and treated by simply washing with isopropyl alcohol followed by air drying; there was no contact with an oxidizing agent. The adhesion promoting agent was applied in a separate primer coating from a solution containing one part by volume gamma-glycidoxypropyltrimethoxysilane, five parts by volume distilled water, and 95 parts by volume isopropyl alcohol. After dip-coating in this solution the primed article was baked one hour at 90° C. The top coat was then applied from a solution containing no silane compound. The formulation and coating procedures were the same as those prescribed in Example 2. This particular coating showed very poor initial adhesion and, therefore, the abrasion resistance of this coating was not evaluated. This demonstrated that contact with a strong oxidizing agent was also necessary to achieve adequate adhesion.

While my invention has been described in terms of certain preferred embodiments, it will be appreciated that other forms thereof could readily be adapted by one skilled in the art. For example, it would be obvious in view of this disclosure to coat another transparent polymer with a SAN film and then treat that surface with the disclosed process to achieve abrasion resistance. Therefore, the scope of my invention is not to be limited to the specific embodiments illustrated.

What is claimed is:

1. A transparent, abrasion-resistant article comprising a styrene-acrylonitrile resin base layer and a coating layer integrally bonded to said base layer consisting essentially of the dried condensation reaction product of, by weight, from
   1. 1 to 10 parts of partially hydrolyzed poly(vinyl acetate),
   2. 10 to 50 parts of tetraethyl orthosilicate, said silicate being previously equilibrated in the presence of water, and
   3. from ½ to 15 parts of a silane compound selected from the group consisting of those compounds described by the general formula:

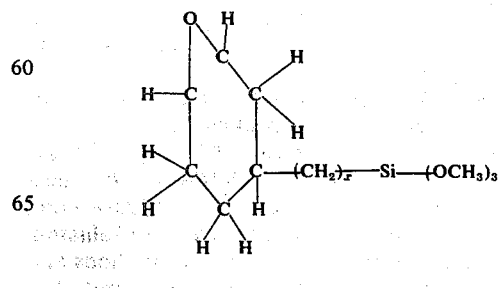

where x is from 1 to 10 and those indicated by the general formula:

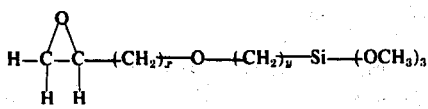

where x is from 1 to 10 and y is from 1 to 10, said trimethoxy functionality of said silane being initially hydrolyzed in said solution, said condensation reaction product being essentially a crosslinked matrix.

2. A transparent, abrasion-resistant article comprising a styrene-acrylonitrile resin base layer and a coating layer integrally bonded to said base layer consisting essentially of the dried condensation reaction product of, by weight, from
  1. 1 to 10 parts of partially hydrolyzed poly(vinyl acetate),
  2. 10 to 50 parts of tetraethyl orthosilicate, said silicate being previously equilibrated in the presence of water, and
  3. ½ to 15 parts of gamma-glycidoxypropyltrimethoxysilane.

3. A method of forming a clear, abrasion-resistant coating film on a styrene-acrylonitrile copolymer resin base layer comprising:
  a. treating a surface of said base layer with a strong oxidizing solution consisting essentially of a strong alkali metal dichromate, a strong mineral acid and water,
  b. applying a coating solution to said activated surface of said base layer, said coating solution comprising by weight,
    1. 1 to 10 parts partially hydrolyzed poly(vinyl acetate), and
    2. 20 to 40 parts water, and
    3. 20 to 40 parts of a solvent selected from the group consisting of alkyl alcohols having up to 7 carbon atoms, and alkyl carboxylic acids having up to 7 carbon atoms, and
    4. 10 to 50 parts of tetraethyl orthosilicate, said silicate being previously equilibrated in the presence of water, and
    5. from ½ part to 15 parts of silane compound selected from the group consisting of those compounds described by the general formula:

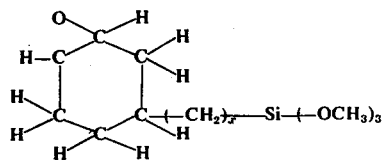

where x is from 1 to 10 and those compounds described by the general formula:

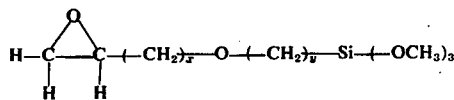

where x is from 1 to 10 and y is from 1 to 10, with said trimethoxy functionality of said silane being initially hydrolyzed in said solution, and c. baking said treated and coated base layer to form a dried coating consisting essentially of the crosslinked condensation product of said equilibrated tetraethyl orthosilicate, said partially hydrolyzed poly(vinyl acetate), and said hydrolyzed silane compound.

4. A method of forming a clear, abrasion-resistant coating film on a styrene-acrylonitrile copolymer resin base layer comprising:
  a. treating a surface of said base layer with an oxidizing agent to chemically activate said surface,
  b. applying a coating solution to said chemically activated surface of said base layer, said coating solution comprising, by weight,
    1. 1 to 10 parts of partially hydrolyzed poly(vinyl acetate), and
    2. 20 to 40 parts water, and
    3. 20 to 40 parts of a solvent selected from the group consisting of alkyl alcohols having up to 7 carbon atoms, and alkyl carboxylic acids having up to 7 carbon atoms, and
    4. 10 to 50 parts of tetraethyl orthosilicate, said silicate being previously equilibrated in the presence of water, and
    5. ½ part to 15 parts of an adhesion promoting agent selected from the group consisting of a compound described by the general formula:

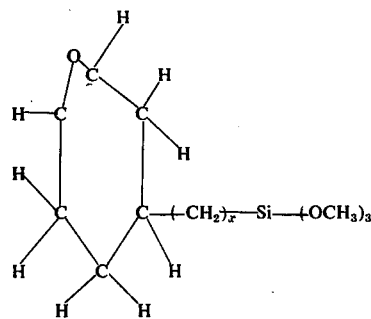

where x is from 1 to 10 and compounds with the general formula:

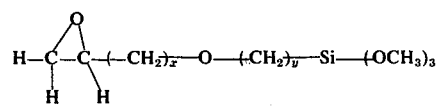

where x is from 1 to 10 and y is from 1 to 10,
  c. baking said treated and coated base layer to dry said coating and to form the crosslinked condensation product of said equilibrated tetraethyl orthosilicate, said hydrolyzed poly(vinyl acetate), and said hydrolyzed silane compound and to form an integral bond by means of said adhesion promoting agent with said chemically activated surface.

5. A method of forming a clear, abrasion-resistant coating film bonded onto a styrene-acrylonitrile copolymer resin base layer comprising:
  a. treating a surface of said base layer with an oxidizing agent to chemically activate said surface,
  b. applying to and wetting said activated base layer with a primer solution comprising an adhesion promoting primer selected from a group consisting of compounds with the general formula:

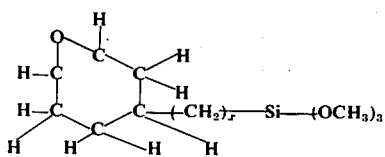

where $x$ is from 1 to 10 and compounds with the general formula:

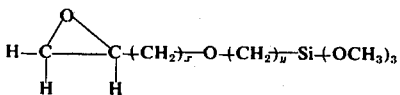

where $x$ is from 1 to 10 and $y$ is from 1 to 10;
c. baking said base layer to dry said primer, d. applying a coating solution to said base layer comprising, by weight, from
1. 1 to 10 parts of partially hydrolyzed poly(vinyl acetate), and
2. 20 to 40 parts water, and
3. 20 to 40 parts of a solvent selected from the group consisting of alkyl alcohols having up to 7 carbon atoms, and alkyl carboxylic acids having up to 7 carbon atoms, and
4. 10 to 50 parts of tetraethyl orthosilicate, said silicate being previously equilibrated in the presence of water, and e. baking said treated and coated base layer to form a dry crosslinked condensation coating product of said equilibrated tetraethyl orthosilicate, said hydrolyzed poly(vinyl acetate), and said hydrolyzed silane of said primer.

* * * * *

UNITED STATES PATENT AND TRADEMARK OFFICE
CERTIFICATE OF CORRECTION

PATENT NO. : 3,998,991
DATED : December 21, 1976
INVENTOR(S) : Roger L. Kaas

It is certified that error appears in the above—identified patent and that said Letters Patent are hereby corrected as shown below:

In the Abstract, the first formula in column 2; column 2, between lines 24-34; column 8, between lines 57-67; column 9, between lines 48-57; column 10, between lines 28-42; and column 11, between lines 1-8, the general formula should appear as follows:

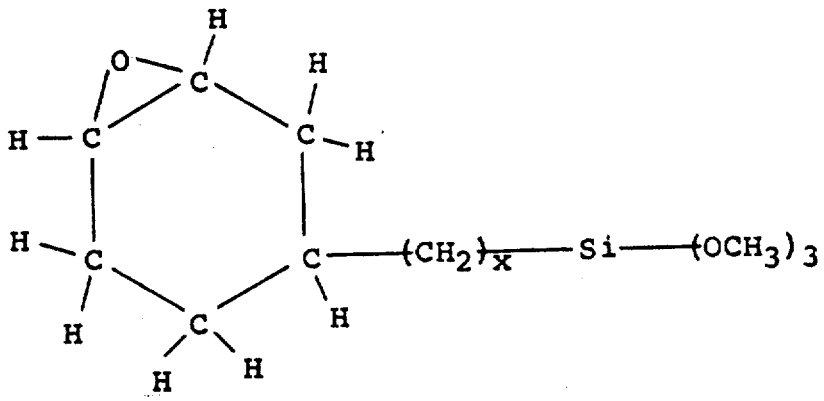

In the Abstract, the second formula in column 2 should appear as follows:

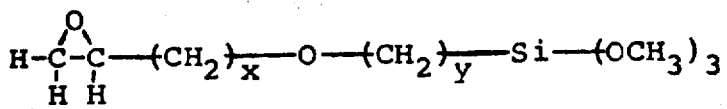

Column 5, line 2, before "inches" insert -- four --; line 45, after "both" insert -- the --; line 48, after "formulation" delete "of". Column 6, line 50, "appreciable" should read -- appreciated --. Column 7, line 41, "temperaturehumidity" should read -- temperature-humidity --; line 61, "primer" should read -- primed --. Column 9, claim 3, line 29, after "with" delete "a strong" and insert -- an --; line 30, after "of" delete "a strong" and insert -- an --; line 46, before "silane" insert -- a --.

Signed and Sealed this

Fifth Day of April 1977

[SEAL]

Attest:

RUTH C. MASON
Attesting Officer

C. MARSHALL DANN
Commissioner of Patents and Trademarks